(12) United States Patent
Catovic et al.

(10) Patent No.: US 10,251,145 B2
(45) Date of Patent: Apr. 2, 2019

(54) REGISTRATION REJECTION DUE TO CELLULAR INTERNET OF THINGS FEATURE INCOMPATIBILITY

(71) Applicant: QUALCOMM Incorporated, San Diego, CA (US)

(72) Inventors: Amer Catovic, Carlsbad, CA (US); Lenaig Genevieve Chaponniere, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/642,180

(22) Filed: Jul. 5, 2017

(65) Prior Publication Data

US 2018/0020417 A1 Jan. 18, 2018

Related U.S. Application Data

(60) Provisional application No. 62/363,181, filed on Jul. 15, 2016.

(51) Int. Cl.
*H04W 60/00* (2009.01)
*H04W 76/18* (2018.01)
(Continued)

(52) U.S. Cl.
CPC ............ *H04W 60/00* (2013.01); *H04W 4/70* (2018.02); *H04W 8/02* (2013.01); *H04W 48/16* (2013.01);
(Continued)

(58) Field of Classification Search
CPC ....... H04W 4/70; H04W 12/06; H04W 36/14; H04W 60/00; H04W 60/04; H04W 76/18; H04W 8/02; H04W 8/12; H04W 24/08; H04W 36/0022; H04W 36/08; H04W 36/24; H04W 48/16; H04W 4/12; H04W 4/60; H04W 4/80; H04W 4/90;
(Continued)

(56) References Cited

U.S. PATENT DOCUMENTS 9,820,197 B2 * 11/2017 Kiss ...................... H04W 76/18
10,028,174 B2 * 7/2018 Jiang ................. H04W 36/0022
(Continued)

FOREIGN PATENT DOCUMENTS

EP 2584805 A2 4/2013

OTHER PUBLICATIONS

3GPP TS 29.274 V12.12.0, Mar. 2016, Tunnelling Protocol for Control Plan State 3 (Year: 2016).*
(Continued)

*Primary Examiner* — Matthew C Sams
(74) *Attorney, Agent, or Firm* — Arent Fox, LLP

(57) ABSTRACT

In one aspect, a method, a computer-readable medium, and an apparatus for wireless communication are provided. The apparatus may receive a registration request including requested features by a UE. The apparatus may determine to reject the registration request based on the requested CIoT optimization features. The apparatus may select a cause value from a plurality of cause values to include in a registration reject message to the UE. The apparatus may send the registration reject message to the UE.

52 Claims, 10 Drawing Sheets

(51) Int. Cl.
*H04W 48/16* (2009.01)
*H04W 8/02* (2009.01)
*H04W 4/70* (2018.01)
*H04W 84/04* (2009.01)
*H04W 60/04* (2009.01)

(52) U.S. Cl.
CPC ............ *H04W 76/18* (2018.02); *H04W 60/04* (2013.01); *H04W 84/042* (2013.01)

(58) Field of Classification Search
CPC ... H04W 76/023; H04W 76/14; H04W 76/50; H04W 84/042; H04W 88/02; H04W 8/065; H04W 8/18; H04W 8/205; H04W 92/18; H04L 67/12; H04L 61/2007; H04L 63/08; H04L 63/126; H04L 67/02
See application file for complete search history.

(56) References Cited

U.S. PATENT DOCUMENTS

| | | | | |
|---|---|---|---|---|
| 2014/0378129 | A1* | 12/2014 | Jiang | H04W 60/04 455/432.1 |
| 2015/0245256 | A1 | 8/2015 | Kiss | |
| 2016/0374134 | A1* | 12/2016 | Kweon | H04L 67/12 |
| 2017/0230809 | A1* | 8/2017 | DM | H04W 4/90 |
| 2017/0332308 | A1* | 11/2017 | Tiwari | H04L 67/04 |
| 2017/0359237 | A1* | 12/2017 | Hao | H04L 67/02 |
| 2018/0020417 | A1* | 1/2018 | Catovic | H04W 76/18 |

OTHER PUBLICATIONS

Alcatel-Lucent et al., "EPS Attach for CIoT EPS Optimization", 3GPP Draft; C1-160103_24.301_R13_CIOT_Attach, 3rd Generation Partnership Project (3GPP), Mobile Competence Centre; 650, Route Des Lucioles; F-06921 Sophia-Antipolis Cedex; France, vol. CT WG1, No. Nashville (TN), USA; Jan. 11, 2016-Jan. 15, 2016, Jan. 10, 2016 (Jan. 10, 2016), XP051049037, 25 Pages, Retrieved from the Internet: URL:http://www.3gpp.org/ftp/Meetings_3GPP_SYNC/CT1/Docs/ [retrieved on Jan. 10, 2016].

Alcatel-Lucent Vodafone QUALCOMM et al., "Introduction of Attach Procedure Changes for CIoT EPS Optimisation", 3GPP Draft; 23401_CR2951R9_CIOT_(REL-13)_S2-161160 WAS S2-160836 WAS S2-154452—Attach-Clean, 3rd Generation Partnership Project (3GPP), Mobile Competence Centre; 650, Route Des Lucioles; F-06921 SO vol. SA WG2, No. Sophia Antipolis, France; Feb. 23, 2016-Feb. 26, 2016, Mar. 6, 2016 (Mar. 6, 2016), XP051077490, 16 Pages, Retrieved from the Internet: URL:http://www.3gpp.org/ftp/Meetings_3GPP_SYNC/SA/Docs/ [retrieved on Mar. 7, 2016].

International Search Report and Written Opinion—PCT/US2017/040954—ISA/EPO—dated Oct. 24, 2017.

QUALCOMM Incorporated: "Attach Reject-Due to Incompabbility Between PNB and SNB with New Cause Value", 3GPP Draft; C1-162968_C1-162685_C1-161835-24 301-Attach_Reject-New_CV-AL T.1, 3rd Generation Partnership Project (3GPP), Mobile Competence Centre; 650, Route Des Lucioles; F-06921 Sophia-Antipolis CE, vol. CT WG1, No. Osaka; Apr. 23, 2016-Apr. 27, 2016, May 30, 2016 (May 30, 2016), XP051110942, 7 Pages, Retrieved from the Internet: URL:http://www.3gpp.org/ftp/tsg_ct/WG1_mm-cc-sm_ex-CN1/TSGC_1_98_Osaka/docs/ [retrieved on May 30, 2016].

QUALCOMM Incorporated: "Rejecting Attach Request Due to Unsupported CIoT Features", 3GPP Draft; C1-162683-DP-Attach_Reject_Unsupported_CIOT_Features, 3rd Generation Partnership Project (3GPP), Mobile Competence Centre; 650, Route Des Lucioles; F-06921 Sophia-Antipolis Cedex; France, vol. CT WG1, No. Osaka; May 23, 2016-May 23, 2016, May 22, 2016 (May 22, 2016), XP051101062, 4 Pages, Retrieved from the Internet: URL:http://www.3gpp.org/ftp/Meetings_3GPP SYNC/CT1/Docs/ [retrieved on May 22, 2016].

\* cited by examiner

REGISTRATION REJECTION DUE TO CELLULAR INTERNET OF THINGS FEATURE INCOMPATIBILITY

CROSS-REFERENCE TO RELATED APPLICATION(S)

This application claims the benefit of U.S. Provisional Application Ser. No. 62/363,181, entitled "REGISTRATION REJECT DUE TO CIOT FEATURE INCOMPATABILITY" and filed on Jul. 15, 2016, which is expressly incorporated by reference herein in its entirety.

BACKGROUND

Field

The present disclosure relates generally to communication systems, and more particularly, to a registration rejection due to cellular Internet of Things (CIoT) feature incompatibility.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

CIoT is a type of wireless communication technology that may provide certain CIoT features at the upper layer (e.g., non-access stratum (NAS) layer). A non-exhaustive list of CIoT features may include data transfer over the control plane (e.g., control plane (CP) CIoT optimization), a suspend mode/resume mode of operation when data is sent over a user plane (e.g., user plane (UP) CIoT optimization), network attachment without Packet Data Network (PDN) connectivity (e.g., Extended evolved packet system (EPS) mobility management (EMM) registered without PDN connection), and support for short message service (SMS) without attaching to both circuit-switched (CS) services and packet-switched (PS) services (e.g., combined attach). Because CS services and PS services may be independent of one another, CS services and PS services may or may not be concurrently supported by a UE and by a core network entity. In certain configurations, the core network entity that manages the CS services and PS services may be a Mobility Management Entity (MME).

When a user equipment (UE) attempts registration with a network with the intent to use one of the CIoT features, the UE may indicate in a registration request (e.g., that is sent to a core network entity) which of the CIoT features UE intends to use.

A registration request sent by the UE (e.g., to the core network entity) may indicate that the UE supports one or more CIoT features such as an attach procedure without PDN connectivity, CP CIoT optimization, and UP CIoT optimization. In addition, the registration request may indicate that the UE would like to use the CP CIoT optimization. In one configuration, the core network entity may maintain a list of supported CIoT features supported by the core network entity and requested CIoT features associated with the UE.

The core network entity may determine if the feature(s) (e.g., CP CIoT optimization) requested by the UE are supported by the core network entity, and if so, the core network entity may accept the registration request. If the core network entity does not support the requested feature(s) (e.g., CP CIoT optimization), but the core network entity supports one of the UE's indicated CIoT features, the core network entity may accept the registration request.

If, however, the core network entity does not support any of the UE's requested CIoT features (e.g., CP CIoT optimization) or supported CIoT features (e.g., attach procedure without PDN connectivity, CP CIoT optimization, and UP CIoT optimization) indicated in the registration request, the core network entity may send a registration reject message rejecting the registration of the UE. However, because the registration reject message may not indicate the reason for the registration rejection (e.g., that the current PLMN and/or TA does not support any of the UE's supported CIoT features), the UE may continue to attempt to attach to the current PLMN and/or the current tracking area (TA), which may increase the time needed by the UE to attach to the network.

The present disclosure provides a solution by including a cause value in the registration reject message that may cause the UE to attach to a PLMN and/or TA that supports the UE's CIoT features. For example, a first cause value may be included in the registration reject message to cause the UE to select another PLMN. Alternatively, a second cause value may be included in the registration reject message to cause the UE to select another TA in the same PLMN. By providing a cause value in the registration reject message, backward compatibility issues may be reduced, the development effort for CIoT networks may be reduced, undefined UE behavior may be reduced, and the time spent retrying unsuccessful registration attempts and time searching for a network that can accept the registration request may be reduced.

In an aspect of the disclosure, a method, a computer-readable medium, and an apparatus for wireless communication are provided. The apparatus may receive a registration request including requested features from a UE. In one aspect, the requested features may include CIoT optimization features. In certain other aspects, the CIoT optimization features may include at least a requested EPS optimization. In certain other aspects, the apparatus may determine to reject the registration request based on the requested features. In certain other aspects, the apparatus may select a cause value from a plurality of cause values to include in a registration reject message to the UE. In certain other aspects, the plurality of cause values may include at least a first cause value and a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the apparatus may send the registration reject message to the UE.

In certain other implementations, the apparatus may transmit a registration request including requested features to a core network entity. In certain aspects, the requested features may include CIoT optimization features. In certain other aspects, the CIoT optimization features may include a requested EPS optimization. In certain other aspects, the apparatus may receive a registration reject message including a cause value. In certain other aspects, the cause value may include one of a first cause value or a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the apparatus may determine whether to search for another tracking area of a current PLMN based on the cause value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
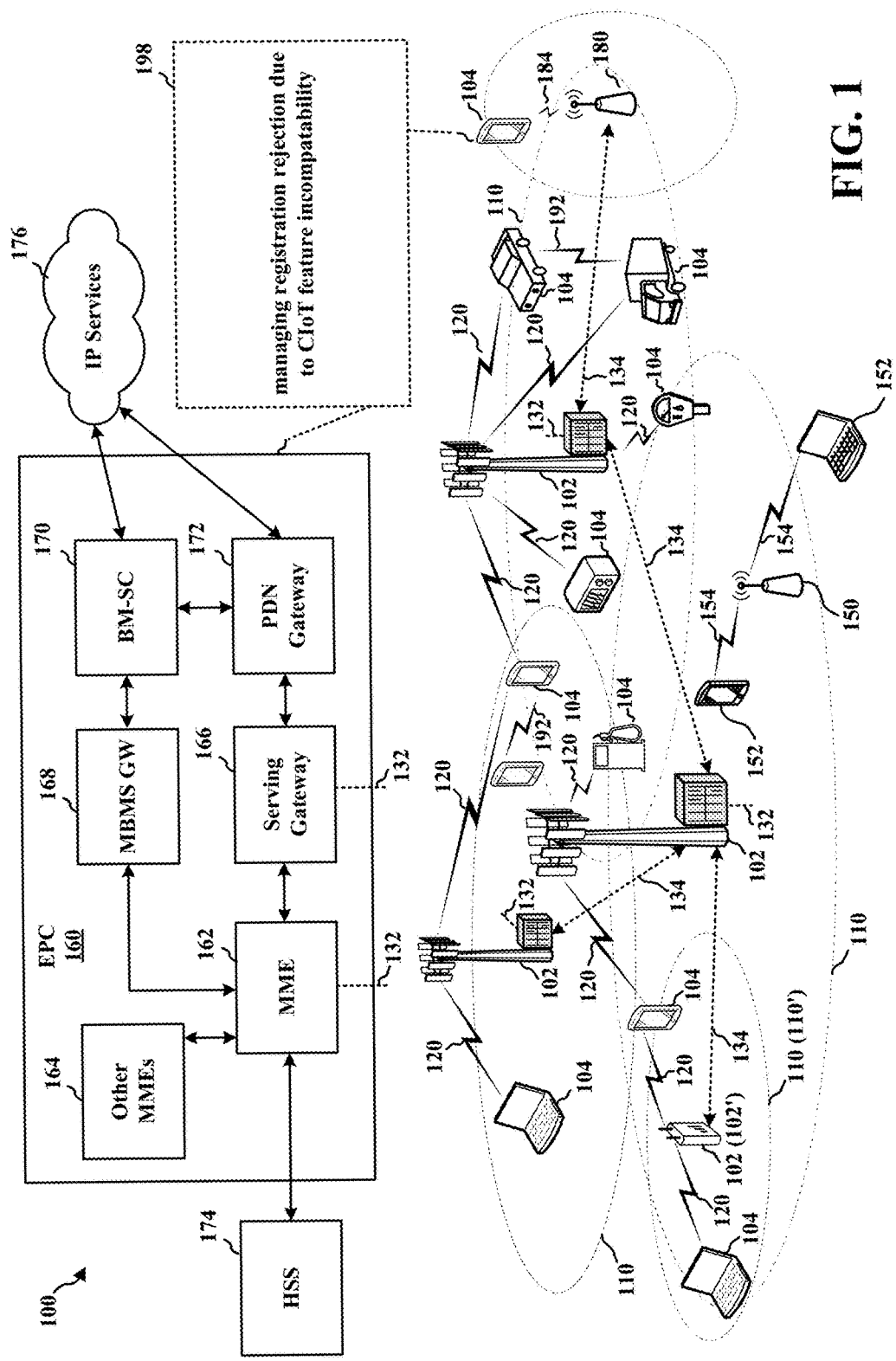
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for NAS messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a MME 162, other MMEs 164, a Serving Gateway 166, a Multimedia Broadcast Multicast Service (MBMS) Gateway 168, a Broadcast Multicast Service Center (BM-SC) 170, and a PDN Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP)

packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 or the network (e.g., the MME 162) may be configured to manage (198) registration rejection due to CIoT feature incompatibility. Details of the operations performed at 198 will be further described below with respect to FIGS. 4-12.

Figure 2:
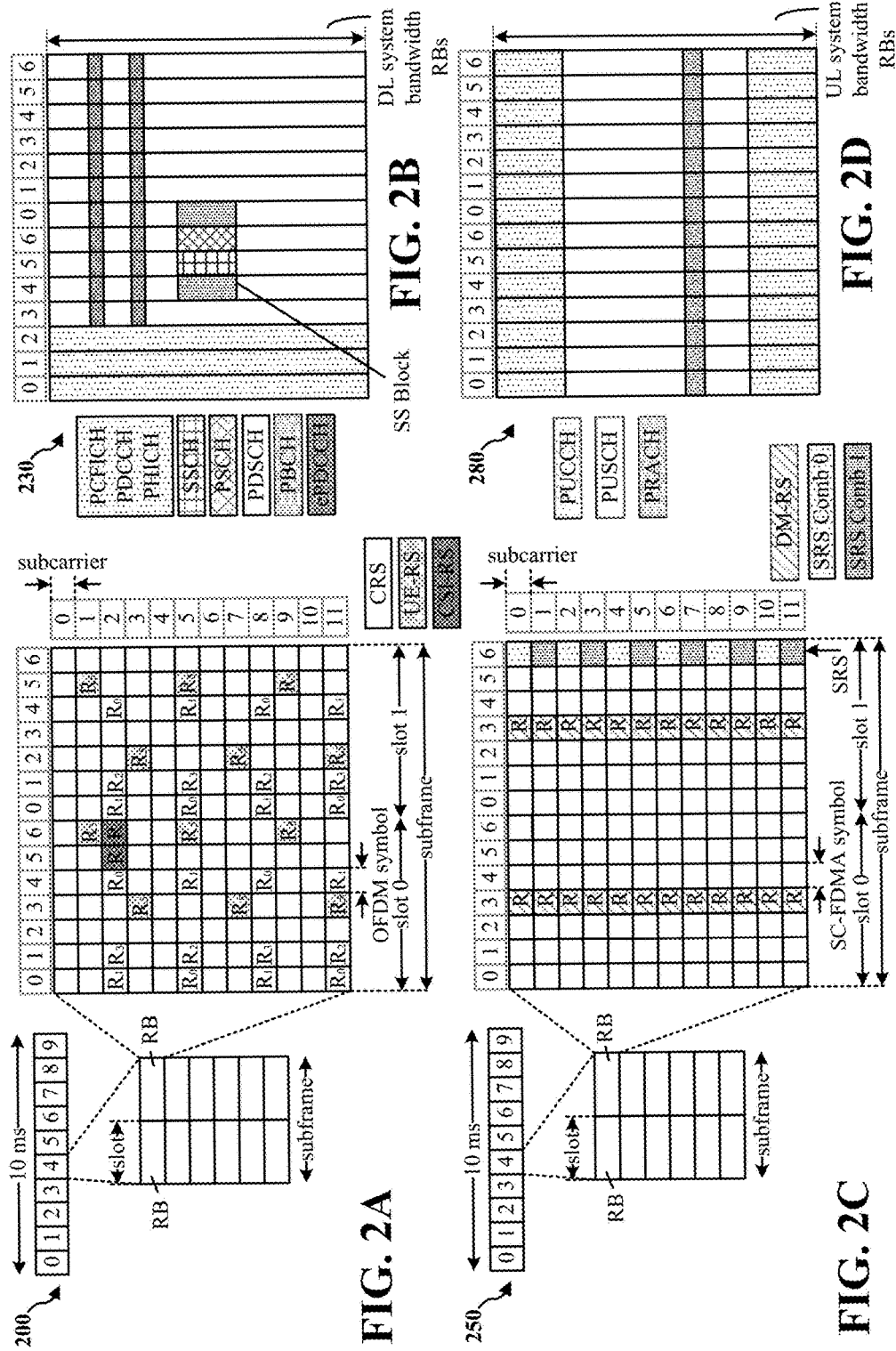
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
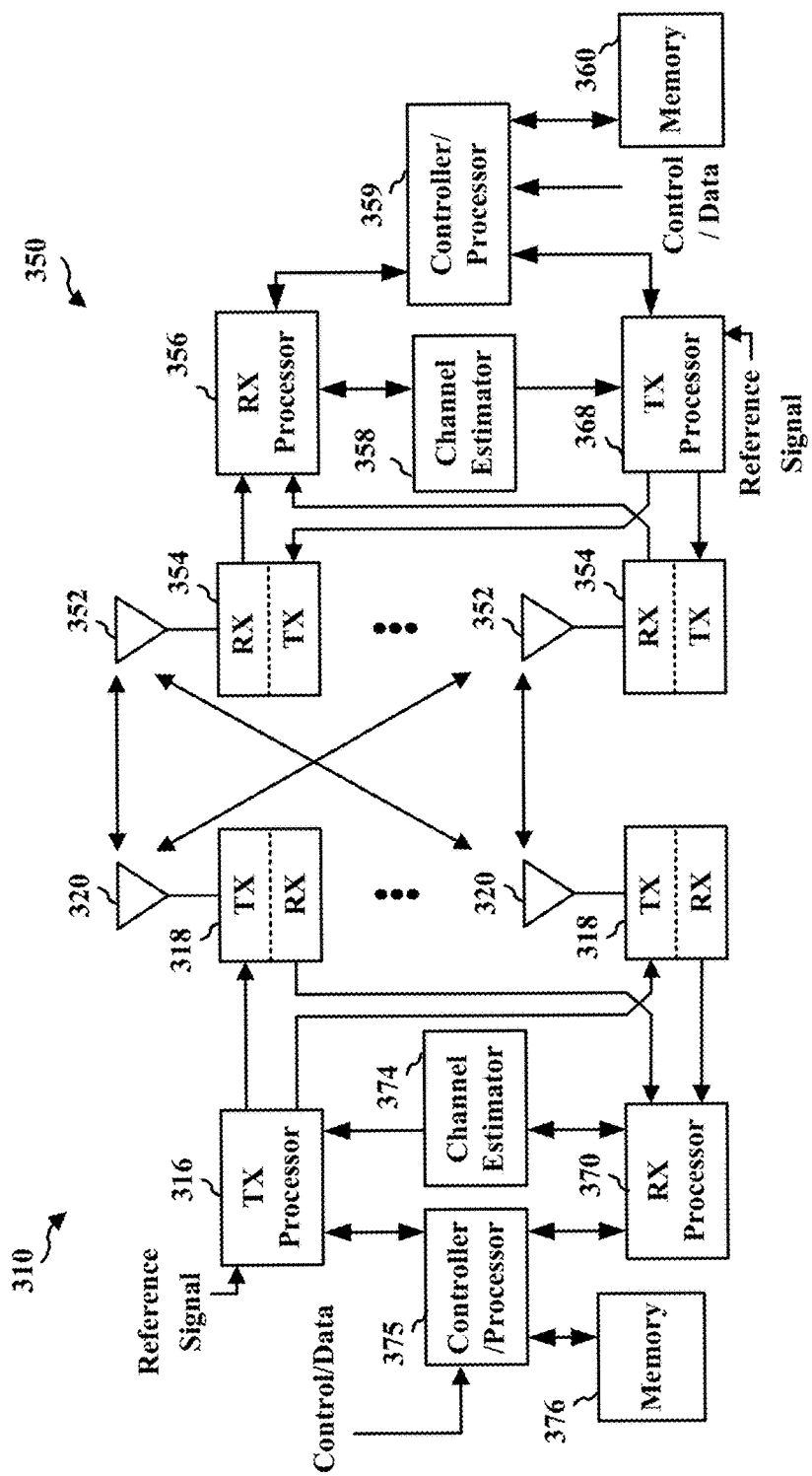
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

CIoT is a type of wireless communication technology that may provide certain CIoT features at the upper layer (e.g., NAS layer). A non-exhaustive list of CIoT features may include data transfer over the control plane (e.g., CP CIoT optimization), a suspend mode/resume mode of operation when data is sent over a user plane (e.g., UP CIoT optimization), network attachment without PDN connectivity (e.g., EMM-REGISTERED without PDN connection), and support for SMS without attaching to both CS services and PS services (e.g., combined attach). Because CS services and PS services may be independent of one another, CS services and PS services may or may not be concurrently supported by a UE and/or by the a core network entity. In certain configurations, the core network entity that manages the CS services and PS services may be a MME.

When a UE attempts register with a network and use one or more of the CIoT features, the UE may indicate in a registration request (e.g., that is sent to a core network entity) which of the CIoT features UE intends to use. "Registration" as used herein may mean an attach procedure or a TA update procedure. A "registration request" and/or a "registration reject message" as used herein may mean sending an attach request message, an attach reject message, a Tracking Area Update (TAU) request message, and/or a TAU reject message. A "cause value" as used herein may mean a cause information element (IE).

A registration request sent by the UE (e.g., to the core network entity) may indicate that the UE supports an attach procedure without PDN connectivity, CP CIoT optimization, and UP CIoT optimization. In addition, the registration request may indicate that the UE would like to use the CP CIoT optimization. In one configuration, the core network entity may maintain a list of supported CIoT features by the core network entity and requested CIoT features associated with the UE.

The core network entity may determine if the CIoT feature(s) (e.g., CP CIoT optimization) requested by the UE are supported by the core network entity, and if so, the core network entity may accept the registration request. If the core network entity does not support the requested feature(s) (e.g., CP CIoT optimization), but the core network entity supports one of the UE's requested CIoT features, the core network entity may accept the registration request.

If, however, the core network entity does not support any of the UE's requested CIoT features (e.g., CP CIoT optimization) or the UE's supported CIoT features (e.g., attach procedure without PDN connectivity, CP CIoT optimization, and UP CIoT optimization) indicated in the registration request, the core network entity may send a registration reject message that rejects the registration of the UE.

However, because the registration reject message may not indicate the reason for the registration rejection (e.g., that the current PLMN and/or TA does not support any of the UE's supported CIoT features), the UE may continue to attempt to attach to the current PLMN and/or TA, which may increase the time needed by the UE to attach to the network.

In certain scenarios, CIoT feature incompatibility may not be detected by the network. For example, CIoT feature incompatibility may be detected based on the SIB indications by the network 1) when a UE requests SMS without combined attach and the network does not support SMS without combined attach, and 2) when the UE operates in WB-S1 mode and supports only S1-U data transfer, and the network does not support S1-U data transfer. Moreover, SIB indications about the network support for CIoT optimizations represent a rare case of core network capabilities advertised in the radio network. The SIB indications may require a coordinated deployment of CIoT features across the radio network and the core network. Therefore, the need to reject the registration request due to CIoT feature incompatibility between the network and the UE may need to be addressed in the scenarios in which SIB indications are provided by the network.

The present disclosure provides a solution to the problems discussed above by including a cause value in the registration reject message. The cause value may cause the UE to attach to a PLMN and/or TA that supports the UE's CIoT features.

In one configuration, the information associated with the UE's requested CIoT features and UE supported CIoT features included in the registration request may indicate a preferred network behavior to the core network entity. If the preferred network behavior (e.g., the UE's supported CIoT features included in the registration request) included in the registration request is incompatible with the core network entity's supported CIoT features (e.g., the UE indicates support for CP CIoT optimization and the core network entity only supports UP CIoT optimization), the core network entity may reject the registration reject message with an appropriate cause value (e.g., a cause value that avoids attempting to register on the current PLMN and/or the current TA).

For example, a first cause value may be included in the registration reject message to cause the UE to select another PLMN. Alternatively, a second cause value may be included in the registration reject message to cause the UE to select another TA in the same PLMN.

By providing a cause value in the registration reject message, backward compatibility issues may be reduced (e.g., the ability of legacy UEs to be able to function by using legacy techniques by ignoring new features while new UEs may be able to take advantage of the new features), the development effort for CIoT networks may be reduced, undefined UE behavior may be reduced, and the time spent retrying unsuccessful registration attempts and time searching for a network that can accept the registration request may be reduced.

Figure 4:
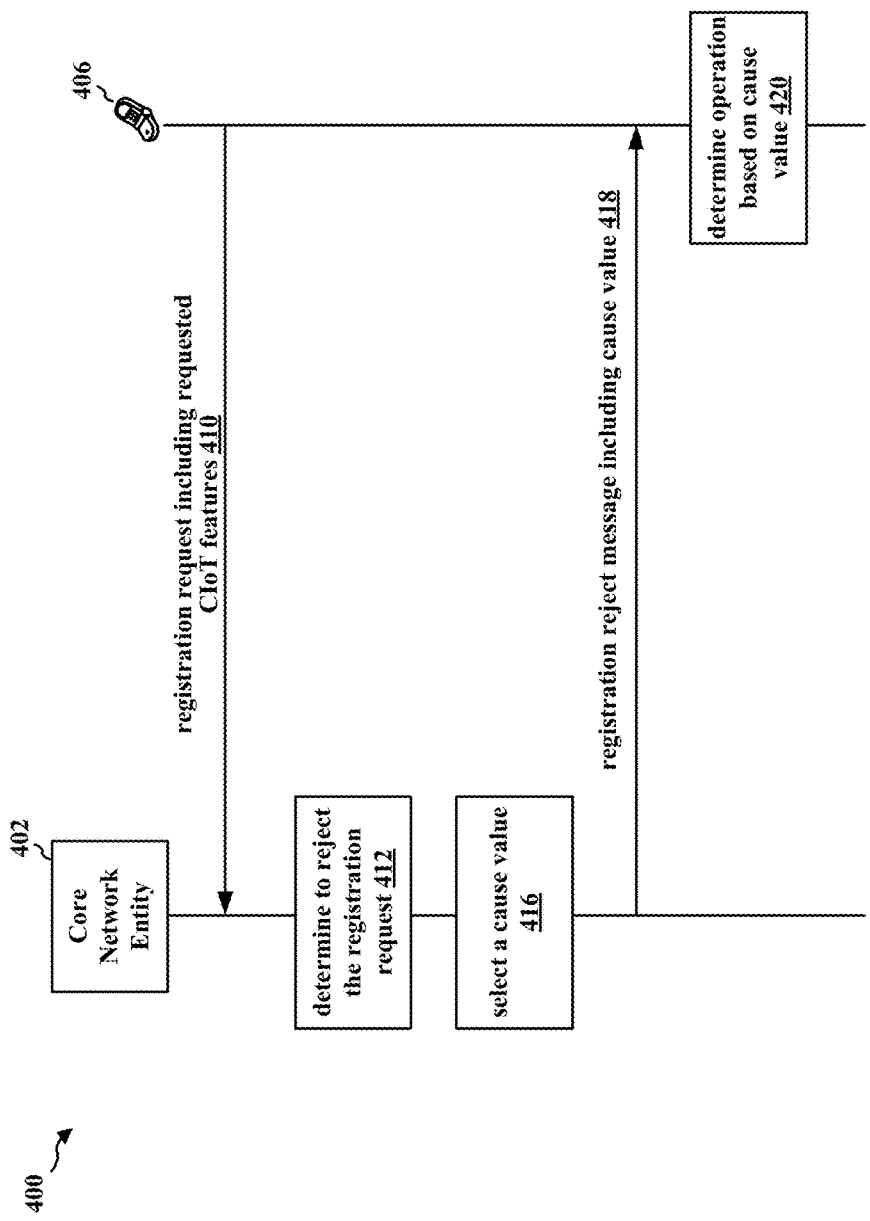
FIG. 4 is a diagram illustrating an example of handling the incompatibility between features supported by the device and the network in a wireless communication system.

FIG. 4 is a diagram illustrating an example of handling the incompatibility between features supported by the device and the network in a wireless communication system 400. In this example, the wireless communication system 400 may include a UE 406 (e.g., the UE 104, 350, 406, 650, apparatus 902/902') and a core network entity 402 (e.g., the MME 162, the core network entity 402, 950, the apparatus 602/602', a core network entity in a 5G NR network).

At 410, the UE 406 may send a registration request including a request for CIoT features to the core network entity 402. For example, the CIoT optimization features that may be indicated in the registration request include support for an attach procedure without PDN connectivity, CP CIoT optimization, UP CIoT optimization, SMS without combined attach, and/or S1-U data transfer.

At 412, the core network entity 402 may determine to reject the registration request from the UE 406. In one configuration, the core network entity 402 may determine whether there is compatibility between the UE's requested CIoT features and the core network entity's 402 supported CIoT features. If there is no CIoT feature compatibility between the UE 406 and the core network entity 402, the core network entity 402 may determine to reject the registration request.

In certain scenarios, the core network entity 402 may indicate to one or more UEs which CIoT features are supported by the core network entity 402 in a SIB (e.g., a SIB indication that is broadcast or transmitted to surrounding UEs). In certain scenarios, the CIoT feature incompatibility between the core network entity 402 and the UE 406 may not be detected based on the SIB indications. The scenarios in which the CIoT feature incompatibility may not be detected include 1) when the network does not support SMS without combined attach requested by the UE and 2) when the network does not support S1-U data transfer, and the UE operates in WB-S1 mode and only supports S1-U data transfer.

Moreover, SIB indications indicating supported CIoT features may represent a case of radio network capabilities advertised in the network. The SIB indications may use a fully coordinated deployment of CIoT features across a radio network and the core network. The SIB indications may not be an essential or even required feature from the point of view of the radio network. The radio network may include base stations (e.g., cells) communicating over the air with the UEs. The base stations may be connected to the core network (e.g., over wireline) which may include network entities (e.g., MME, HSS, etc.). The core network may manage subscription data, access control, etc., and communicate with an external network (e.g., the internet).

At 416, the core network entity 402 may select a cause value to be included in the registration reject message. In one configuration, the core network entity 402 may determine which cause value to include in the registration reject message based on one or more of 1) whether the UE 406 is in narrowband (NB) S1 (NB-S1) mode or in wide band (WB) S1 (WB-S1) mode (e.g., the core network entity 402 may receive information from the radio network that indicates whether the UE 406 operates in NB-S1 mode or WB-S1 mode), 2) knowledge of the supported CIoT features in local deployment, such as availability of another tracking area (e.g., in another frequency) in the same area of the current PLMN that the UE 406 could attempt to register with etc., and/or 3) other information available in the core network entity 402.

If the registration request and/or a TA update request is rejected due to incompatibility between the CIoT features (e.g., CIoT EPS optimizations) supported by the UE 406 and the CIoT features supported by the network, the core network entity 402 may set the EMM cause value to #15 indicating "No suitable cells in tracking area". If the core network entity 402 determines that the UE 406 needs to search for another PLMN (e.g., rather than search for a suitable cell in another TA of the current PLMN) the core network entity 402 may include the Extended EMM cause IE with a value that indicates the "requested EPS optimization not supported".

If the core network entity 402 determines that the UE 406 may not find another TA worthy of attempting registration (e.g., a TA that supports the UE's 406 supported CIoT features), the core network entity 402 may include a cause value in the registration reject message that causes the UE 406 to select another network (e.g., another PLMN). In order to cause the UE 406 to select another PLMN, in a first configuration, cause value #15 with Extended EMM cause IE set to "requested EPS optimization not supported" (e.g., a new value) may be included in the registration reject message by the core network entity 402. In order to cause the UE 406 to select another PLMN, in a second configuration, a new cause value (e.g., a new cause value #xy) that indicates that the "requested EPS optimization not supported" may be selected by the core network entity 402 and included in the registration reject message.

One advantage associated with the first configuration may be that cause value #15 with Extended EMM cause IE set to "requested EPS optimization not supported" is backward compatible with legacy UE's. Namely, legacy UE's may ignore the new value in the Extended EMM cause IE set to "requested EPS optimization not supported," and use legacy behavior corresponding to cause value #15. One advantage associated with the second configuration may include that the new cause value #xy may be used to define fully dedicated UE behavior. Table 1 seen below includes additional details with respect to Extended EMM cause IEs.

TABLE 1

| Bit | |
|---|---|
| E-UTRAN allowed value (octet 1, bit 1) | |
| 1 | |
| 0 | E-UTRAN allowed |
| 1 | E-UTRAN not allowed |
| EPS optimization info (octet 1, bit 2) | |
| 2 | |
| 0 | no EPS optimization info |
| 1 | requested EPS optimization not supported |

Bit 3 and bit 4 of octet 1 are spare and shall be coded as zero.
Bit 1 and bit 2 of octet 1 shall not be set to 1 simultaneously.

As seen above in Table 1, an Extended EMM cause IE may contain a bitmap where certain bits are used to convey specific info to the UE 406. In particular, bit 2 in octet 1 of the Extended EMM cause IE may be used to indicate to the UE 406 whether the registration reject message is due to the CIOT features requested by the UE40 not being supported by the network. When the bit is set to '0', the Extended EMM cause IE does not contain any specific info as to the reason for the rejection. When the bit is set to '1', the rejection is due to due to the CIoT features requested by the UE 406 not being supported by the network.

If the core network entity 402 determines that the UE 406 may find another TA worthy of attempting registration (e.g., a TA that supports the UE's requested and/or supported CIoT features), the core network entity 402 may select a cause value that causes the UE 406 to select another TA in the same network (e.g., the current PLMN). For example cause value #15 without Extended EMM cause value set to "requested EPS optimization not supported" or to a new cause value (e.g., new cause value #xy) dedicated to this rejection scenario may be selected.

At 418, the core network entity 402 may send the registration reject message including the selected cause value to the UE 406.

At 420, the UE 406 may determine its behavior based on the cause value included in the registration reject message. Depending on the received cause value in the registration reject message, the UE 406 may search for another TA (e.g., when cause value #15 is received without the Extended EMM cause value set to "requested EPS optimization not supported"), or search for another PLMN (e.g., when cause value #15 is received with Extended EMM cause value set to "requested EPS optimization not supported"). In another example, the UE 406 may search for another TA when an existing cause value (e.g., #15) is received (with optional Extended EMM cause value), and search for another PLMN when the new cause value (e.g., #xy) is received. In one configuration, the UE may search for another TA in the same PLMN by searching and/or scanning for other available cells that are in a different TA (e.g., the TA to which a cell belongs may be indicated in the SIB broadcast by the cell).

Causing the UE 406 to search for another TA may be useful in the multi-frequency deployments found in legacy LTE networks, in which multiple frequency layers overlap in coverage providing overlapping TAs on different frequencies. On the other hand, NB-IoT may not be deployed over multiple frequency layers. As a result, a UE 406 operating in NB-S1 mode may be unlikely to find suitable NB-IoT cells in other TAs. As such, when the UE 406 is located in a NB-IoT network, the UE 406 may perform a search for a new PLMN rather than waste time looking for a suitable cell in another TA of the same PLMN.

Alternatively, the new Extended EMM cause IE included with the cause value #15 may result in the UE 406 searching for a new PLMN. The core network entity 402 may provide the new Extended EMM cause IE with the cause value #15 to the UE 406 when the core network entity 402 determines that the UE 406 will not find a suitable cell in another TA of the same PLMN compatible with the UE's 406 supported CIoT features. The determination by the core network entity 402 may be based on the UE's 406 mode (i.e. NB-S1 vs. WB-S1), deployment knowledge (e.g. knowledge that there is another TA on a different frequency in the same area with the CIoT feature(s) that the UE 406 wants to use), and potentially other factors. In all other cases, the core network entity 402 may provide the legacy cause value #15 without Extended EMM cause IE and the UE 406 may follow the legacy behavior for cause value #15.

In certain implementations, when a registration reject message that includes cause value #15 with the Extended EMM cause IE set to "requested EPS optimization not supported" is received, the UE's 406 behavior may be based on the UE's mode of operation (e.g., NB-S1 mode or WB-S1 mode). For example, upon receiving the registration reject message, a UE 406 in NB-S1 mode may search for a new PLMN upon receiving the registration reject message, whereas a UE 406 in WB-S1 mode behaves according to the legacy cause value #15 (e.g., searches for a suitable cell in another TA of the same PLMN first).

In certain implementations, upon receiving the registration reject message with a cause value indicating to search for another PLMN (e.g., if the Extended EMM cause value indicates "requested EPS optimization not supported"), the UE 406 may place the current PLMN and/or the current TA where the registration rejection message was received in a list of forbidden PLMNs and/or TAs. Forbidden PLMNs and/or TAs may not be selected by the UE 406 in a subsequent search for a certain time period. The list of forbidden PLMNs and/or TAs may be erased after the certain time period, or upon power cycling at the UE 406 or when the Subscriber Identity Module (SIM) card at the UE 406 is removed. The forbidden list may be stored in the UE 406 or in the SIM card at the UE 406. In one configuration, the UE 406 may place the current PLMN+RAT or TA+RAT combination in the forbidden list. Examples of RATs include NB-IoT, WB-E-UTRAN, UTRAN, GERAN, etc.

In certain other configurations, upon receiving a registration reject message with a cause value indicating to search for another PLMN (e.g., if the Extended EMM cause value indicates "requested EPS optimization not supported"), the UE 406 may 1) delete a list of equivalent PLMNs and set an attach attempt counter to a predetermined value (e.g., a value of five), 2) enter a state "EMM-DEREGISTERED.PLMN-SEARCH" in order to perform a new PLMN selection, and 3) not consider the PLMN that provided the registration rejection message a candidate for PLMN selection until the UE 406 is switched off or the Universal Integrated Circuit Card (UICC) containing the Universal SIM (USIM) card is removed. The list of equivalent PLMNs may be sent by the network entity 402 to the UE 406 when the UE 406 registers with the network entity 402. The equivalent PLMNs may be considered by the UE 406 as "equivalent" to the registered PLMN, which means the UE 406 may move between the equivalent PLMNs via cell reselection and Tracking Area Update procedure, without the need to perform PLMN selection and Attach procedure (e.g., a more involved process than cell reselection).

As discussed above with respect to FIG. 4, by providing a cause value in the registration reject message, backward compatibility issues may be reduced, the development effort for CIoT networks may be reduced, undefined UE behavior may be reduced, and the time spent retrying unsuccessful registration attempts and time searching for a network that can accept the registration request may be reduced.

Figure 5:
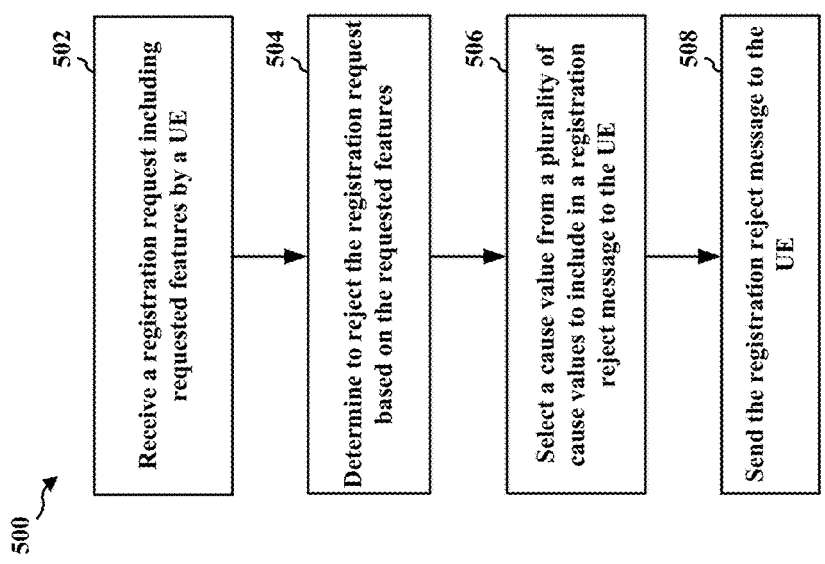
FIG. 5 is a flowchart of a method of wireless communication.

FIG. 5 is a flowchart 500 of a method of wireless communication. The method may be performed by a core network entity (e.g., the MME 162, the core network entity 402, 950, the apparatus 602/602') in communication with a UE (e.g., the UE 104, 350, 406, 650, apparatus 902/902').

At 502, the core network entity may receive a registration request including requested features from a UE. In certain aspects, the requested features may include CIoT optimization features. In certain other aspects, the CIoT optimization features may include at least a requested EPS optimization. In certain other aspects, the core network entity may be an MME. For example, referring to FIG. 4, at 410, the UE 406 may send a registration request including a request for CIoT features to the core network entity 402. For example, the CIoT features that may be indicated in the registration request include support for an attach procedure without PDN connectivity, CP CIoT optimization, UP CIoT optimization, SMS without combined attach, and/or S1-U data transfer.

At 504, the core network entity may determine to reject the registration request based on the requested features. For example, referring to FIG. 4, at 412, the core network entity 402 may determine to reject the registration request from the UE 406. In one configuration, the core network entity 402 may determine whether there is compatibility between the UE's requested CIoT features and the core network entity's 402 supported CIoT features. If there is no CIoT feature compatibility between the UE 406 and the core network entity 402, the core network entity 402 may determine to reject the registration request.

At 506, the MME may select a cause value from a plurality of cause values to include in a registration reject message to the UE. In certain aspects, the plurality of cause values may include at least a first cause value and a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value may be selected based on whether the UE is in NB-S1 mode or WB-S1 mode in certain other aspects, the cause value may be selected based on knowledge of local deployment. In certain other aspects, the knowledge of the local deployment may include whether the local deployment is such that there exists another tracking area in another frequency in a same area of a current PLMN. In certain aspects, the first cause value may instruct the UE to search for another tracking area worthy of attempting registration in a current PLMN and the first cause value instructs the UE to attempt to find a suitable cell in another tracking area of the current PLMN. In certain other aspects, the second cause value may indicate that the UE will not find another tracking area worthy of attempting registration in the current PLMN and the second cause value may instruct the UE to attempt to find a different PLMN.

In certain other aspects, the cause value number may indicate whether the UE can find another tracking area worthy of attempting registration in the current PLMN. In certain other aspects, the cause value number may indicate that the CIoT optimization features are not supported in the current PLMN. For example, referring to FIG. 4, at 416, the core network entity 402 may select a cause value to be included in the registration reject message. In one configuration, the core network entity 402 may determine which cause value to include in the registration reject message based on one or more of 1) whether the UE 406 is in NB-S1 mode or in wide band WB-S1 mode (e.g., the core network entity 402 may receive information from the radio network that indicates whether the UE 406 operates in NB-S1 mode or WB-S1 mode), 2) knowledge of the supported CIoT features in local deployment, such as availability of another tracking area (e.g., in another frequency) in the same area of the current PLMN that the UE 406 could attempt to register with etc., and/or 3) other information available in the core network entity 402. If the registration request and/or a TA update request is rejected due to incompatibility between the CIoT features (e.g., CIoT EPS optimizations) supported by the UE 406 and the CIoT features supported by the network, the core network entity 402 may set the EMM cause value to #15 indicating "No suitable cells in tracking area". If the core network entity 402 determines that the UE 406 needs to search for another PLMN (e.g., rather than search for a suitable cell in another TA of the current PLMN) the core network entity 402 may include the Extended EMM cause IE with a value that indicates that "requested EPS optimization not supported". If the core network entity 402 determines that the UE 406 may not find another TA worthy of attempting registration (e.g., a TA that supports the UE's 406 supported CIoT features), the core network entity 402 may include a cause value in the registration reject message that causes the UE 406 to select another network (e.g., another PLMN). In order to cause the UE 406 to select another PLMN, in a first configuration, cause value #15 with Extended EMM cause IE set to "requested EPS optimization not supported" (e.g., a new value) may be included in the rejection reject message by the core network entity 402. In order to cause the UE 406 to select another PLMN, in a second configuration, a new cause value (e.g., a new cause value #xy) that indicates that the "requested EPS optimization not supported" may be selected by the core network entity 402 and included in the rejection reject message. One advantage associated with the first configuration may be that cause value #15 with Extended EMM cause IE set to "requested EPS optimization not supported" is backward compatible with legacy UE's. Namely, legacy UE's may ignore the new value in the Extended EMM cause IE set to "requested EPS optimization not supported," and use legacy behavior corresponding to cause value #15. One advantage associated with the second configuration may include that the new cause value #xy may be used to define fully dedicated UE behavior. If the core network entity 402 determines that the UE 406 may find another TA worthy of attempting registration (e.g., a TA that supports the UE's requested and/or supported CIoT features), the core network entity 402 may select a cause value that causes the UE 406 to select another TA in the same network (e.g., the current PLMN). For example cause value #15 without Extended EMM cause value set to "requested EPS optimization not supported" or a new cause value (e.g., new cause value #xy) dedicated to this rejection scenario may be selected.

At 508, the core network entity may send the registration reject message to the UE. For example, referring to FIG. 4, at 418, the core network entity 402 may send the registration reject message including the selected cause value to the UE 406.

Figure 6:
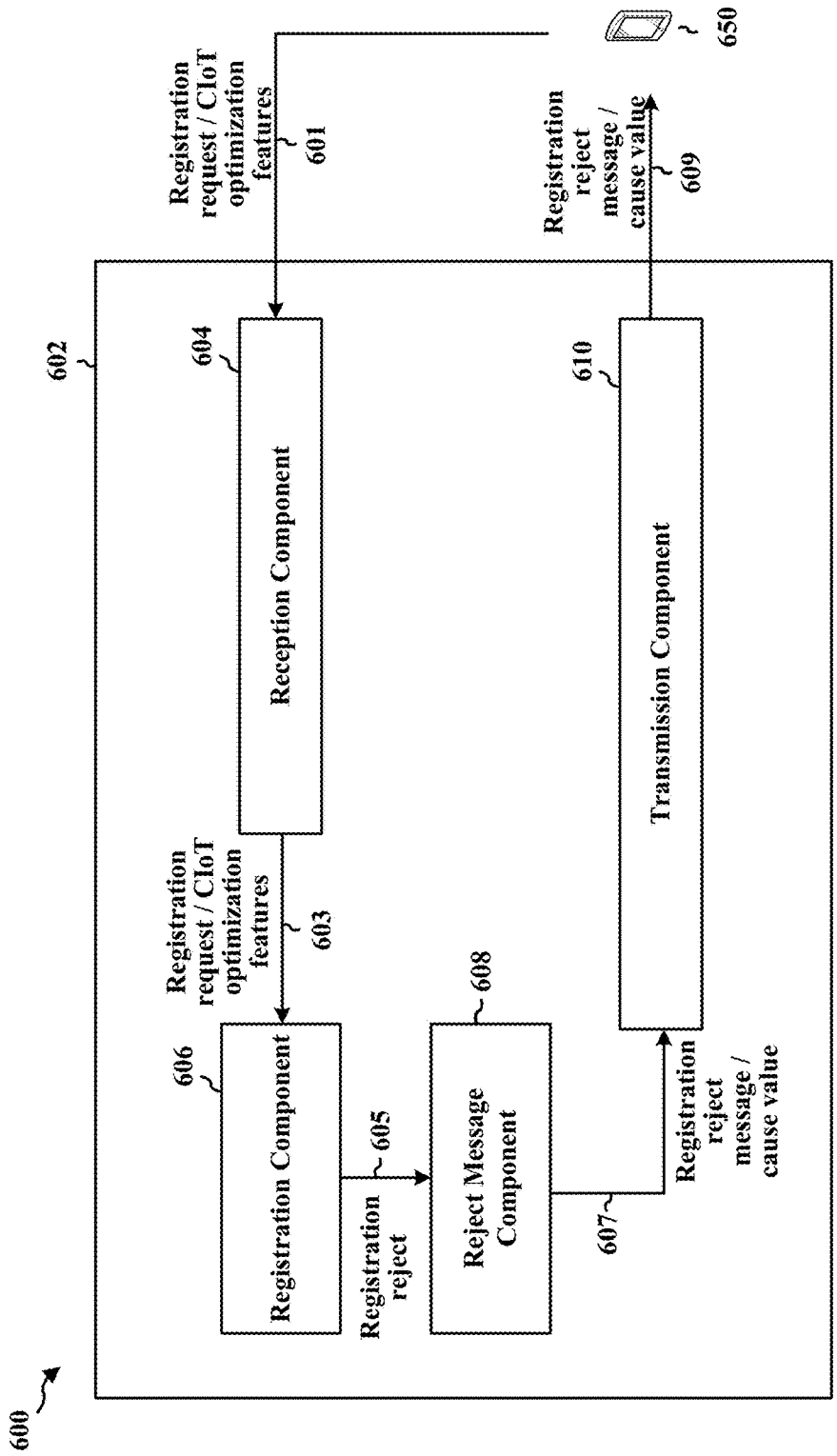
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a core network entity (e.g., the MME 162, the core network entity 402, 950, the apparatus 602') in communication with a UE 650 (e.g., the UE 104, 350, 406, 650, apparatus 902/902'). The apparatus may include a reception component 604, a registration component 606, a reject message component 608, and a transmission component 610.

The reception component 604 may be configured to receive a registration request 601 including requested features from the UE 650. In certain aspects, the requested features may include CIoT optimization features. In certain other aspects, the CIoT optimization features may include at least a requested EPS optimization. The reception component 604 may be configured to send a signal 603 associated with the registration request that includes the requested features (e.g., CIoT optimization features) to the registration component 606.

The registration component 606 may be configured to determine to reject the registration request based on the requested features. For example, the registration component 606 may compare the requested features to the features supported by the network of the apparatus 602, and determine to reject the registration request when it is determined that the requested CIoT features are incompatible with the network. The registration component 606 may be configured to send a signal 605 indicating that the registration request is rejected to the reject message component 608.

The reject message component 608 may be configured to select a cause value from a plurality of cause values to include in a registration reject message to the UE. In certain aspects, the plurality of cause values may include at least a first cause value and a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value may be selected based on whether the UE is in NB-S1 mode or WB-S1 mode. In certain other aspects, the cause value may be selected based on knowledge of local deployment. In certain other aspects, the knowledge of the local deployment may include whether the local deployment is such that there exists another tracking area in another frequency in a same area of a current PLMN. In certain aspects, the first cause value may instruct the UE to search for another tracking area worthy of attempting registration in a current PLMN and the first cause value instructs the UE to attempt to find a suitable cell in another tracking area of the current PLMN. In certain other aspects, the second cause value may indicate that the UE will not find another tracking area worthy of attempting registration in the current PLMN and the second cause value may instruct the UE to attempt to find a different PLMN.

In certain other aspects, the cause value number may indicate that the CIoT optimization features are not supported in the current PLMN. The reject message component 608 may be configured to generate a registration reject message that includes the cause value. The reject message component 608 may be configured to send a signal 607 associated with the registration reject message that includes the cause value to the transmission component 610.

The transmission component 610 may be configured to send the registration reject message 609 to the UE 650.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
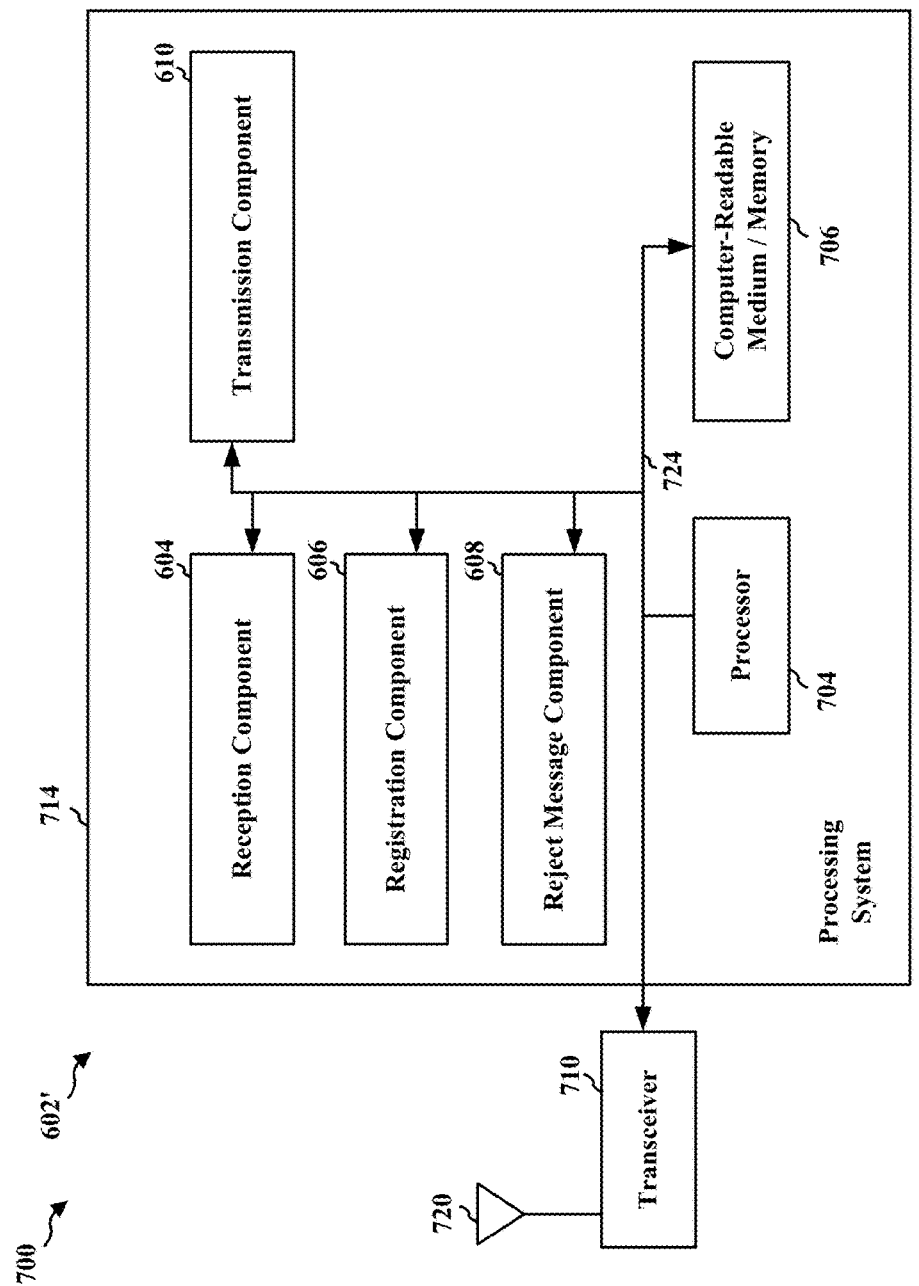
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof.

In certain configurations, the apparatus 602/602' for wireless communication may include means for receiving a registration request including requested features from a UE. In certain aspects, the requested features may include CIoT optimization features. In certain other aspects, the CIoT optimization features may include at least a requested EPS optimization. In certain other aspects, the core network entity may be an MME. In certain other configurations, the apparatus 602/602' for wireless communication may include means for determining to reject the registration request based on the requested features. In certain other configurations, the apparatus 602/602' for wireless communication may include means for selecting a cause value from a plurality of cause values to include in a registration reject message to the UE. In certain aspects, the plurality of cause values may include at least a first cause value and a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value may be selected based on whether the UE is in NB-S1 mode or WB-S1 mode. In certain other aspects, the cause value may be selected based on knowledge of local deployment. In certain other aspects, the knowledge of the local deployment may include whether the local deployment is such that there exists another tracking area in another frequency in a same area of a current PLMN. In certain aspects, the first cause value may instruct the UE to search for another tracking area worthy of attempting registration in a current PLMN and the first cause value instructs the UE to attempt to find a suitable cell in another tracking area of the current PLMN. In certain other aspects, the second cause value may indicate that the UE will not find another tracking area worthy of attempting registration in the current PLMN and the second cause value may instruct the UE to attempt to find a different PLMN.

In certain other aspects, the cause value number may indicate that the CIoT optimization features are not supported in the current PLMN. In certain other configurations, the apparatus 602/602' for wireless communication may include means for sending the registration reject message to the UE. The aforementioned means may be one or more of the aforementioned components of the apparatus 602 and/or the processing system 714 of the apparatus 602' configured to perform the functions recited by the aforementioned means.

Figure 8:
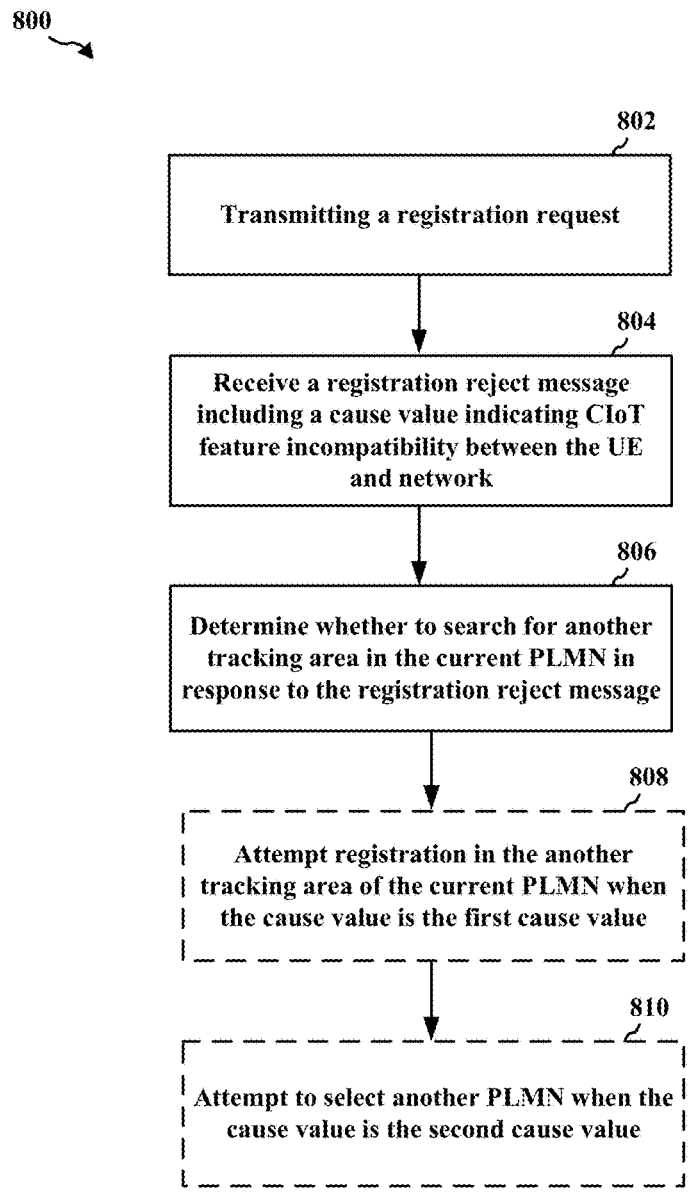
FIG. 8 is a flowchart of a method of wireless communication.

FIG. 8 is a flowchart 800 of a method of wireless communication. The method may be performed by a UE (e.g., the UE 104, 350, 406, 650, apparatus 902/902') in communication with a core network entity (e.g., the MME 162, the core network entity 402, 950, the apparatus 602/602'). In FIG. 8, operations indicated with dashed lines indicate optional operations.

At 802, the UE may transmit a registration request including requested CIoT features to a core network entity. In certain aspects, the requested features may include CIoT optimization features. In certain other aspects, the CIoT optimization features may include at least a requested EPS optimization. For example, referring to FIG. 4, at 410, the UE 406 may send a registration request including a request for CIoT features to the core network entity 402. For example, the CIoT features that may be indicated in the registration request include support for an attach procedure without PDN connectivity, CP CIoT optimization, UP CIoT optimization, SMS without combined attach, and/or S1-U data transfer.

At 804, the UE may receive a registration reject message including a cause value. In certain aspects, the cause value may include one of a first cause value or a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value number may be dedicated to indicate whether the UE can find another tracking area worthy of attempting registration in the current PLMN. In certain other aspects, the cause value number may be dedicated to indicate that the CIoT optimization features are not supported in the current PLMN. For example, referring to FIG. 4, at 418, the core network entity 402 may send the registration reject message including the selected cause value that is received by the UE 406.

At 806, the UE may determine whether to search for another tracking area of a current PLMN based on the cause value. For example, referring to FIG. 4, the UE 406 may determine its behavior based on the cause value included in the registration reject message. Depending on the received cause value in the registration reject message, the UE 406 may search for another TA (e.g., when cause value #15 is received without the Extended EMM cause value set to "requested EPS optimization not supported"), or search for another PLMN (e.g., when cause value #15 is received with Extended EMM cause value set to "requested EPS optimization not supported"). In another example, the UE 406 may search for another TA when an existing cause value (e.g., #15) is received (with optional Extended EMM cause value), and search for another PLMN when the new cause value (e.g., #xy) is received. In one configuration, searching for another TA in the same PLMN may include searching for a suitable cell in another TA. Alternatively, the new Extended EMM cause IE included with the cause value #15 may result in the UE 406 searching for a new PLMN. The core network entity 402 may provide the new Extended EMM cause IE with the cause value #15 to the UE 406 when the core network entity 402 determines that the UE 406 will not find a suitable cell in another TA of the same PLMN compatible with the UE's 406 supported CIoT features. The determination by the core network entity 402 may be based on the UE's 406 mode (i.e. NB-S1 vs. WB-S1), deployment knowledge (e.g. knowledge that there is another TA on a different frequency in the same area with the CIoT feature(s) that the UE 406 wants to use), and potentially other factors. In all other cases, the core network entity 402 may provide the legacy cause value #15 without Extended EMM cause IE and the UE 406 follows the legacy behavior for cause value #15. In certain implementations, when a registration reject message that includes cause value #15 with the Extended EMM cause IE set to "requested EPS optimization not supported" is received, the UE's 406 behavior may be dictated based on the UE's mode of operation (e.g., NB-S1 mode or WB-S1 mode). For example, upon receiving the registration reject message, a UE 406 in NB-S1 mode may search for a new PLMN right away whereas a UE 406 in WB-S1 mode behaves according to the legacy cause value #15 (e.g., searches for a suitable cell in another TA of the same PLMN first).

At 808, the UE may attempt registration in another tracking area of the current PLMN when the cause value is the first cause value. For example, referring to FIG. 4, depending on the received cause value in the registration reject message, the UE 406 may attempt registration with another TA (e.g., when cause value #15 is received without the Extended EMM cause value set to "requested EPS optimization not supported"). In another example, the UE 406 may attempt registration with another TA when an existing cause value (e.g., #15) is received (with optional Extended EMM cause value). In one configuration, attempting registration with another TA in the same PLMN may include attempting registration with a suitable cell in another TA.

At 810, the UE may attempt to select another PLMN when the cause value is the second cause value. For example, referring to FIG. 4, depending on the received cause value in the registration reject message, the UE 406 may attempt to select another PLMN (e.g., when cause value #15 is received with Extended EMM cause value set to "requested EPS optimization not supported"). In another example, the UE 406 may attempt to select another PLMN when the new cause value (e.g., #xy) is received.

Figure 9:
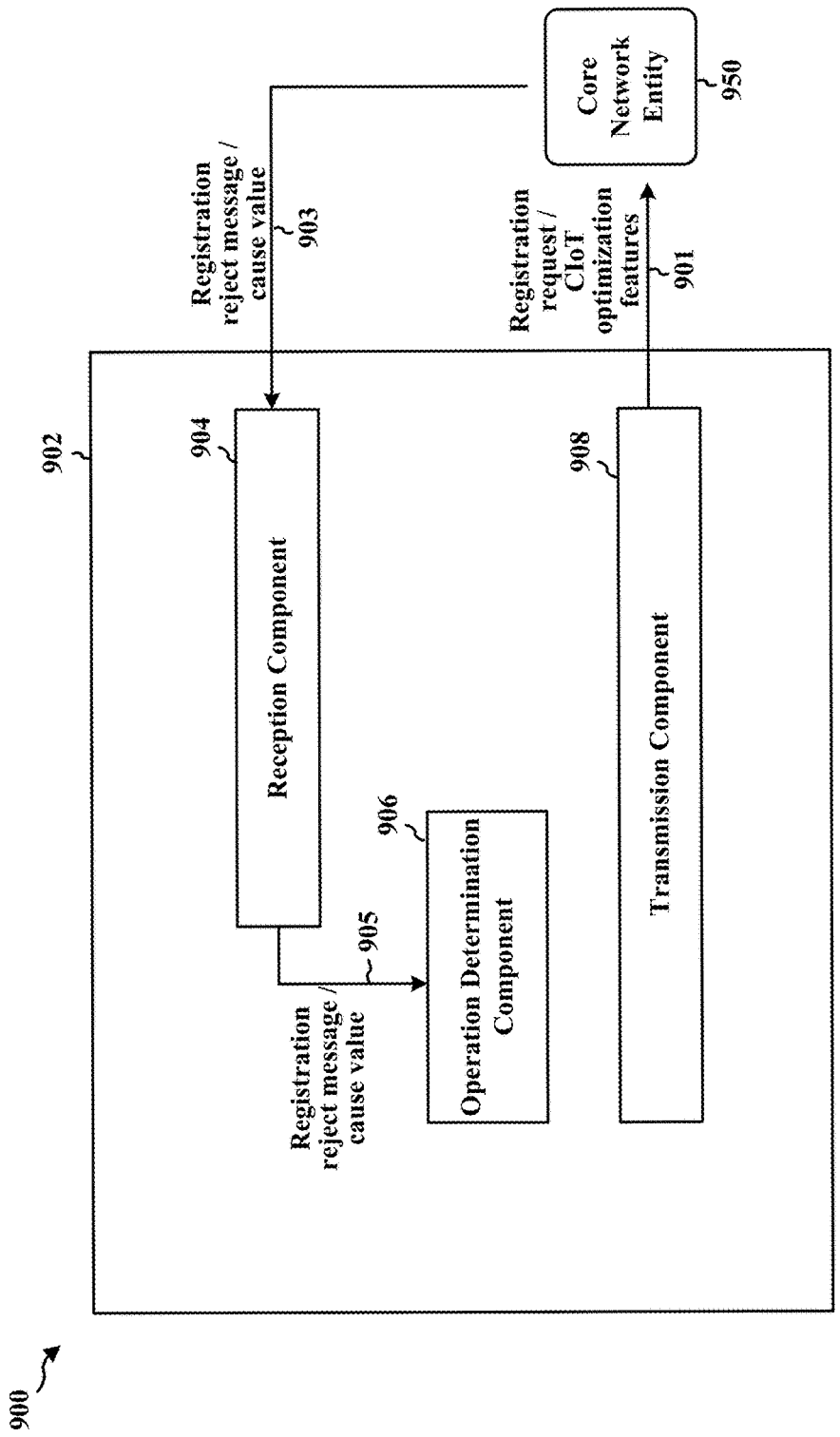
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., the UE 104, 350, 406, 650, apparatus 902/902') in communication with a core network entity 950 (e.g., the MME 162, the core network entity 402, the apparatus 602'). The apparatus may include a reception component 904, an operation determination component 906, and a transmission component 908.

The transmission component 908 may be configured to transmit a registration request 901 including requested features to the core network entity 950. In certain aspects, the requested features may include CIoT optimization features. In certain other aspects, the CIoT optimization features may include at least a requested EPS optimization.

The reception component 904 may be configured to receive a registration reject message 903 including a cause value. In certain aspects, the cause value may include one of a first cause value or a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value number may be dedicated to indicate whether the UE can find another tracking area worthy of attempting registration in the current PLMN. In certain other aspects, the cause value number may be dedicated to indicate that the CIoT optimization features are not supported in the current PLMN. The reception component 904 may be configured to send a signal 905 associated with the registration reject message including the cause value to the operation determination component 906.

The operation determination component 906 may be configured to determine whether to search for another tracking area of a current PLMN based on the cause value. The operation determination component 906 may be configured to attempt registration in the another tracking area of the current PLMN when the cause value is the first cause value. The operation determination component 906 may be configured to attempt to select another PLMN when the cause value is the second cause value.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
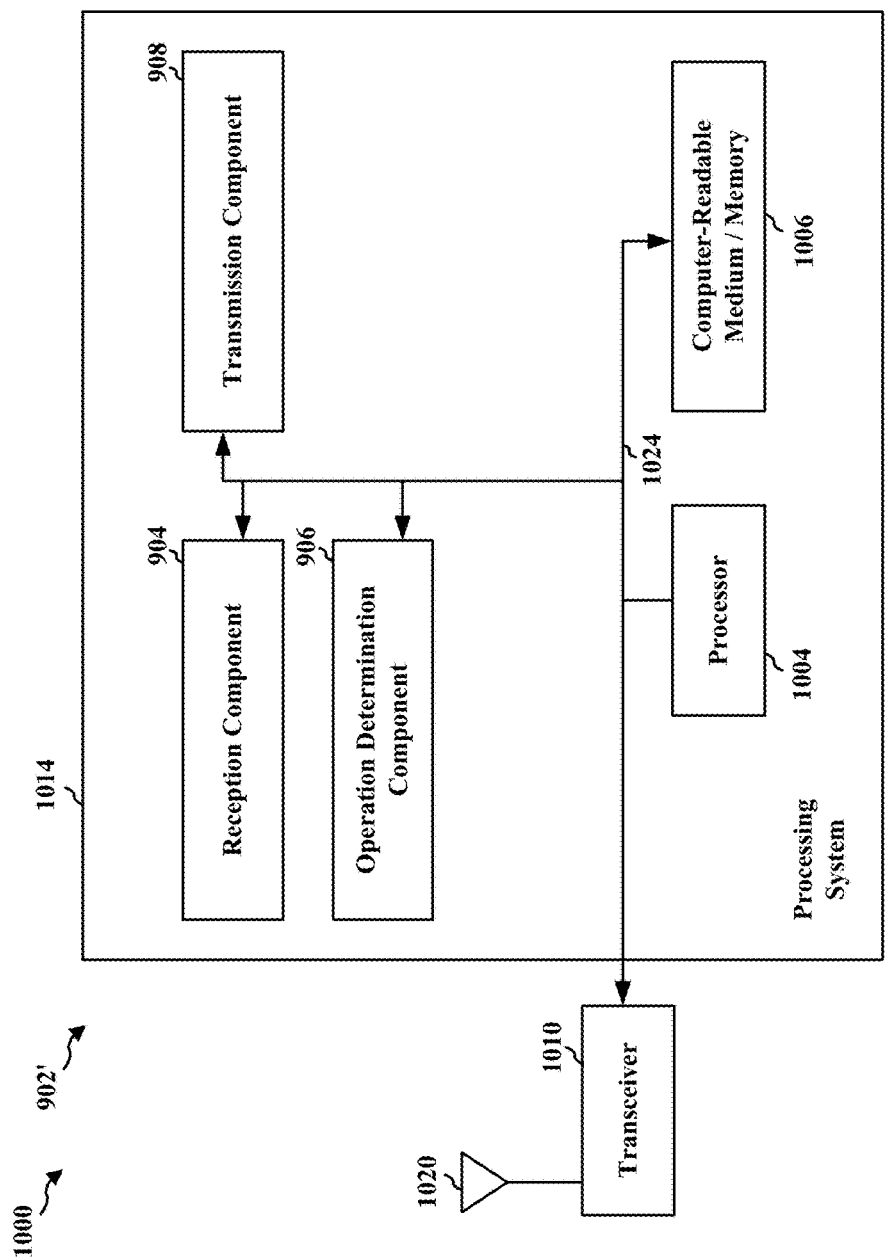
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 908, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In certain configurations, the apparatus 902/902' for wireless communication may include means for transmitting a registration request including requested features to a core network entity. In certain aspects, the requested features may include CIoT optimization features. In certain other aspects, the CIoT optimization features may include at least a requested EPS optimization. In certain other configurations, the apparatus 902/902' for wireless communication may include means for receiving a registration reject message including a cause value. In certain aspects, the cause value may include one of a first cause value or a second cause value. In certain other aspects, the first cause value may include a cause value number. In certain other aspects, the second cause value includes an Extended EMM cause information element. In certain other aspects, the cause value number may be cause value #15. In certain other aspects, the first cause value may indicate that there are no suitable cells in a tracking area. In certain other aspects, the second cause value may indicate that the requested EPS optimization is not supported. In certain other aspects, the cause value number may be dedicated to indicate whether the UE can find another tracking area worthy of attempting registration in the current PLMN. In certain other aspects, the cause value number may be dedicated to indicate that the CIoT optimization features are not supported in the current PLMN. In certain other configurations, the apparatus 902/902' for wireless communication may include means for determining whether to search for another tracking area of a current PLMN based on the cause value. In certain other configurations, the apparatus 902/902' for wireless communication may include means for attempting registration in the another tracking area of the current PLMN when the cause value is the first cause value. In certain other configurations, the apparatus 902/902' for wireless communication may include means for attempting to select another PLMN when the cause value is the second cause value.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a core network entity, comprising:
  receiving a registration request including requested features from a user equipment (UE), wherein the requested features include cellular internet of things (CIoT) optimization features, and wherein the CIoT optimization features at least include a requested evolved packet system (EPS) optimization;
  determining to reject the registration request based on the requested features;
  selecting a first cause value and a second cause value from a plurality of cause values to include in a registration reject message to the UE, wherein:
    the first cause value includes a cause value number,
    the second cause value includes an Extended EPS mobility management (EMM) cause information element,
    the cause value number is cause value #15,
    the first cause value indicates that there are no suitable cells in a tracking area, and
    the second cause value indicates that that the requested EPS optimization is not supported; and
  sending the registration reject message to the UE.

2. The method of claim 1, wherein the first cause value is selected based on whether the UE is in NB-S1 mode or WB-S1 mode.

3. The method of claim 1, wherein the first cause value is selected based on knowledge of local deployment.

4. The method of claim 3, wherein the knowledge of the local deployment comprises whether the local deployment is such that there exists another tracking area on another frequency in a same area of a current public land mobile network (PLMN).

5. The method of claim 1, wherein the first cause value instructs the UE to search for another tracking area configured to support the requested features in a current public land mobile network (PLMN) and the first cause value instructs the UE to attempt to find a suitable cell in another tracking area of the current PLMN.

6. The method of claim 5, wherein the second cause value indicates that the UE will not find another tracking area configured to support the requested features in the current PLMN and the second cause value instructs the UE to attempt to find a different PLMN.

7. The method of claim 6, wherein the first cause value number indicates whether the UE can find another tracking area configured to support the requested features in the current PLMN.

8. The method of claim 1, wherein the cause value number indicates that the CIoT optimization features are not supported in a current public land mobile network (PLMN).

9. The method of claim 1, wherein the core network entity is an MME.

10. A method of wireless communication of a user equipment (UE), comprising:
  transmitting a registration request including requested features to a core network entity, wherein the requested features include cellular internet of things (CIoT) optimization features, and wherein the CIoT optimization features at least include a requested evolved packet system (EPS) optimization;
  receiving a registration reject message including a first cause value and a second cause value, wherein:
    the first cause value includes a cause value number,
    the second cause value includes an Extended EPS mobility management (EMM) cause information element,
    the cause value number is cause value #15,
    the first cause value indicates that there are no suitable cells in a tracking area, and
    the second cause value indicates that that the requested EPS optimization is not supported; and
  determining whether to search for another tracking area of a current public land mobile network (PLMN) based on one or more of the first cause value or the second cause value.

11. The method of claim 10, further comprising:
  attempting registration in the another tracking area of a current public land mobile network (PLMN) or
  attempting to select another PLMN based on the first cause value and the second cause value.

12. The method of claim 10, wherein the cause value number is dedicated to indicate whether the UE can find another tracking area configured to support the requested features in a current public land mobile network (PLMN).

13. The method of claim 10, wherein the cause value number is dedicated to indicate that the CIoT optimization features are not supported in a current public land mobile network (PLMN).

14. An apparatus for wireless communication of a core network entity, comprising:
  means for receiving a registration request including requested features from a user equipment (UE), wherein the requested features include cellular internet of things (CIoT) optimization features, and wherein the CIoT optimization features at least include a requested evolved packet system (EPS) optimization;
  means for determining to reject the registration request based on the requested features;
  means for selecting a first cause value and a second cause value from a plurality of cause values to include in a registration reject message to the UE, wherein:

the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
means for sending the registration reject message to the UE.

15. The apparatus of claim 14, wherein the first cause value is selected based on whether the UE is in NB-S1 mode or WB-S1 mode.

16. The apparatus of claim 14, wherein the first cause value is selected based on knowledge of local deployment.

17. The apparatus of claim 16, wherein the knowledge of the local deployment comprises whether the local deployment is such that there exists another tracking area in another frequency in a same area of a current public land mobile network (PLMN).

18. The apparatus of claim 14, wherein the first cause value instructs the UE to search for another tracking area configured to support the requested features in a current public land mobile network (PLMN) and the first cause value instructs the UE to attempt to find a suitable cell in another tracking area of the current PLMN.

19. The apparatus of claim 18, wherein the second cause value indicates that the UE will not find another tracking area configured to support the requested features in the current PLMN and the second cause value instructs the UE to attempt to find a different PLMN.

20. The apparatus of claim 19, wherein the cause value number indicates whether the UE can find another tracking area configured to support the requested features in the current PLMN.

21. The apparatus of claim 14, wherein the cause value number indicates that the CIoT optimization features are not supported in a current public land mobile network (PLMN).

22. The apparatus of claim 14, wherein the core network entity is an MME.

23. An apparatus for wireless communication of a user equipment (UE), comprising:
means for transmitting a registration request including requested features to a core network entity, wherein the requested features include cellular internet of things (CIoT) optimization features, and wherein the CIoT optimization features at least include a requested evolved packet system (EPS) optimization;
means for receiving a registration reject message including a first cause value and a second cause value, wherein:
the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
means for determining whether to search for another tracking area of a current public land mobile network (PLMN) based on one or more of the first cause value or the second cause value.

24. The apparatus of claim 23, further comprising:
means for attempting registration in the another tracking area of a current public land mobile network (PLMN) or
attempting to select another PLMN based on the first cause value and the second cause value.

25. The apparatus of claim 23, wherein the cause value number is dedicated to indicate whether the UE can find another tracking area configured to support the requested features in a current public land mobile network (PLMN).

26. The apparatus of claim 23, wherein the cause value number is dedicated to indicate that the CIoT optimization features are not supported in a current public land mobile network (PLMN).

27. An apparatus for wireless communication of a core network entity, comprising:
a memory; and
at least one processor coupled to the memory and configured to:
receive a registration request including requested features from a user equipment (UE), wherein the requested features include cellular internet of things (CIoT) optimization features, and wherein the CIoT optimization features at least include a requested evolved packet system (EPS) optimization;
determine to reject the registration request based on the requested features;
select a first cause value and a second cause value from a plurality of cause values to include in a registration reject message to the UE, wherein:
the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
send the registration reject message to the UE.

28. The apparatus of claim 27, wherein the first cause value is selected based on whether the UE is in NB-S1 mode or WB-S1 mode.

29. The apparatus of claim 27, wherein the first cause value is selected based on knowledge of local deployment.

30. The apparatus of claim 29, wherein the knowledge of the local deployment comprises whether the local deployment is such that there exists another tracking area in another frequency in a same area of a current public land mobile network (PLMN).

31. The apparatus of claim 27, wherein the first cause value instructs the UE to search for another tracking area configured to support the requested features in a current public land mobile network (PLMN) and the first cause value instructs the UE to attempt to find a suitable cell in another tracking area of the current PLMN.

32. The apparatus of claim 31, wherein the second cause value indicates that the UE will not find another tracking area configured to support the requested features in the current PLMN and the second cause value instructs the UE to attempt to find a different PLMN.

33. The apparatus of claim 32, wherein the cause value number indicates whether the UE can find another tracking area configured to support the requested features in the current PLMN.

34. The apparatus of claim 27, wherein the cause value number indicates that the CIoT optimization features are not supported in a current public land mobile network (PLMN).

35. The apparatus of claim 27, wherein the core network entity is an MME.

36. An apparatus for wireless communication of a user equipment (UE), comprising:
a memory; and
at least one processor coupled to the memory and configured to:
transmit a registration request including requested features to a core network entity, wherein the requested features include cellular internet of things (CIoT) optimization features, and wherein the CIoT optimization features at least include a requested evolved packet system (EPS) optimization;
receive a registration reject message including a first cause value and a second cause value, wherein:
the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
determine whether to search for another tracking area of a current public land mobile network (PLMN) based on one or more of the first cause value or the second cause value.

37. The apparatus of claim 36, wherein the at least one processor is further configured to:
attempt registration in the another tracking area of a current public land mobile network (PLMN) or
attempt to select another PLMN value based on the first cause value and the second cause value.

38. The apparatus of claim 36, wherein the cause value number is dedicated to indicate whether the UE can find another tracking area configured to support the requested features in a current public land mobile network (PLMN).

39. The apparatus of claim 36, wherein the cause value number is dedicated to indicate that the CIoT optimization features are not supported in a current public land mobile network (PLMN).

40. A non-transitory computer-readable medium storing computer executable code for a core network entity, comprising code to:
receive a registration request including requested features from a user equipment (UE), wherein the requested features include cellular internet of things (CIoT) optimization features, and wherein the CIoT optimization features at least include a requested evolved packet system (EPS) optimization;
determine to reject the registration request based on the requested features;
select a first cause value and a second cause value from a plurality of cause values to include in a registration reject message to the UE, wherein:
the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
send the registration reject message to the UE.

41. The non-transitory computer-readable medium of claim 40, wherein the first cause value is selected based on whether the UE is in NB-S1 mode or WB-S1 mode.

42. The non-transitory computer-readable medium of claim 40, wherein the first cause value is selected based on knowledge of local deployment.

43. The non-transitory computer-readable medium of claim 42, wherein the knowledge of the local deployment comprises whether the local deployment is such that there exists another tracking area in another frequency in a same area of a current public land mobile network (PLMN).

44. The non-transitory computer-readable medium of claim 40, wherein the first cause value instructs the UE to search for another tracking area configured to support the requested features in a current public land mobile network (PLMN) and the first cause value instructs the UE to attempt to find a suitable cell in another tracking area of the current PLMN.

45. The non-transitory computer-readable medium of claim 44, wherein the second cause value indicates that the UE will not find another tracking area configured to support the requested features in the current PLMN and the second cause value instructs the UE to attempt to find a different PLMN.

46. The non-transitory computer-readable medium of claim 45, wherein the cause value number indicates whether the UE can find another tracking area configured to support the requested features in the current PLMN.

47. The non-transitory computer-readable medium of claim 40, wherein the cause value number indicates that the CIoT optimization features are not supported in a current public land mobile network (PLMN).

48. The non-transitory computer-readable medium of claim 40, wherein the core network entity is an MME.

49. A non-transitory computer-readable medium storing computer executable code for a user equipment (UE), comprising code to:
transmit a registration request including requested features to a core network entity, wherein the requested features include cellular internet of things (CIoT) optimization features, and wherein the CIoT optimization features at least include a requested evolved packet system (EPS) optimization;
receive a registration reject message including a first cause value and a second cause value, wherein:
the first cause value includes a cause value number,
the second cause value includes an Extended EPS mobility management (EMM) cause information element,
the cause value number is cause value #15,
the first cause value indicates that there are no suitable cells in a tracking area, and
the second cause value indicates that that the requested EPS optimization is not supported; and
determine whether to search for another tracking area of a current public land mobile network (PLMN) based on one or more of the first cause value or the second cause value.

50. The non-transitory computer-readable medium of claim 49, further comprising code to:
attempt registration in the another tracking area of a current public land mobile network (PLMN) or
attempt to select another PLMN value based on the first cause value and the second cause value.

51. The non-transitory computer-readable medium of claim 49, wherein the cause value number is dedicated to indicate whether the UE can find another tracking area configured to support the requested features in a current public land mobile network (PLMN).

52. The non-transitory computer-readable medium of claim 49, wherein the cause value number is dedicated to indicate that the CIoT optimization features are not supported in a current public land mobile network (PLMN).

* * * * *